United States Patent
Joshi et al.

(10) Patent No.: US 12,468,846 B2
(45) Date of Patent: Nov. 11, 2025

(54) PROTECTING SENSITIVE USER INFORMATION IN DEVELOPING ARTIFICIAL INTELLIGENCE MODELS

(71) Applicant: Microsoft Technology Licensing, LLC, Redmond, WA (US)

(72) Inventors: Dhruv Joshi, Kirkland, WA (US); Robert Sim, Bellevue, WA (US); Antonio Andre Monteiro Manoel, Santos (BR); Sumithra Bhakthavatsalam, Kirkland, WA (US); Ji Li, San Jose, CA (US); John Christian Leone, Milpitas, CA (US); Dolly Sobhani, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 158 days.

(21) Appl. No.: 18/454,997

(22) Filed: Aug. 24, 2023

(65) Prior Publication Data
US 2025/0068764 A1   Feb. 27, 2025

(51) Int. Cl.
*G06N 3/08*     (2023.01)
*G06F 21/62*    (2013.01)
*G06F 40/20*    (2020.01)
*G06N 20/00*    (2019.01)

(52) U.S. Cl.
CPC .......... *G06F 21/6245* (2013.01); *G06F 40/20* (2020.01)

(58) Field of Classification Search
None
See application file for complete search history.

(56) References Cited

U.S. PATENT DOCUMENTS

| | | | |
|---|---|---|---|
| 2018/0018590 A1* | 1/2018 | Szeto | G16H 10/60 |
| 2022/0261631 A1* | 8/2022 | Cohen | G06N 20/00 |
| 2023/0214711 A1* | 7/2023 | Paulraj | G06F 21/60 706/12 |
| 2024/0330589 A1* | 10/2024 | Kotaru | G06F 40/205 |
| 2024/0427810 A1* | 12/2024 | Tishbi | G06F 16/34 |
| 2025/0021767 A1* | 1/2025 | Dharnidharka | G06F 16/90332 |
| 2025/0086308 A1* | 3/2025 | Crume | G06N 5/025 |

* cited by examiner

*Primary Examiner* — Christopher B Robinson
(74) *Attorney, Agent, or Firm* — NovoTechIP International PLLC (57) ABSTRACT

A system for development of an Artificial Intelligence (AI) model while protecting sensitive user information includes: a confidential computing environment in which original prompts to the AI model written by users are collected; a trained synthetic prompt generator to generate synthetic prompts based on the original prompts, wherein the synthetic prompt generator generates anonymized synthetic prompts without sensitive user information identifiable from the original prompts; and a developer computing environment in which the synthetic prompts are submitted to the AI model under development to generate a dataset that includes the synthetic prompts and corresponding AI model output for analysis to determine updates for the AI model while protecting the sensitive user information of actual users.

17 Claims, 6 Drawing Sheets

PROTECTING SENSITIVE USER INFORMATION IN DEVELOPING ARTIFICIAL INTELLIGENCE MODELS

BACKGROUND

Artificial intelligence (AI) describes a large field that includes a number of different types of systems with different capabilities. Within this field are Large Language Models (LLMs), including Generative Pre-training Transformers (GPTs). An LLM or GPT can receive a prompt from a user, usually written in natural language, and can return an intelligent response that may appear to have been written by a human being. These models can provide valuable assistance in a wide range of applications, including but not limited to content generation, language translation and much more.

In order to receive responses from an LLM, users typically submit prompts or queries that describe the desired output or task. These prompts can vary widely in nature and content. Sometimes, perhaps inadvertently, a user may include confidential, proprietary, or personal information in a prompt. Examples of such information may include trade secrets, sensitive business data, personally identifiable information (PII), and other forms of confidential or private content. As a result, the response provided by the LLM may likely also include some or all of this sensitive information.

Designers and developers of LLM-based systems require access to these prompts and the corresponding LLM-generated outputs to review, analyze, and improve the system s performance. This iterative process involves debugging, refining the model, and enhancing the overall user experience. However, this access to the prompts and resulting output compromises the privacy of users, particularly where confidential or personal information was unwittingly or inadvertently included in the prompts.

SUMMARY

In one general aspect, the present description discusses a system for development of an Artificial Intelligence (AI) model while protecting sensitive user information includes: a confidential computing environment in which original prompts to the AI model written by users are collected; a trained synthetic prompt generator to generate synthetic prompts based on the original prompts, wherein the synthetic prompt generator generates anonymized synthetic prompts without sensitive user information identifiable from the original prompts; and a developer computing environment in which the synthetic prompts are submitted to the AI model under development to generate a dataset that includes the synthetic prompts and corresponding AI model output for analysis to determine updates for the AI model while protecting the sensitive user information of actual users.

In another example, a method for development of an Artificial Intelligence (AI) model while protecting sensitive user information includes: collecting original user prompts written for the AI model; generating synthetic prompts based on the original user prompts that hide sensitive information from the original user prompts; using the synthetic prompts to generate responses from the AI model; analyzing the responses from the AI model, each paired with a corresponding synthetic prompt from which the response was generated; and generating updates to the AI model based on the analyzing of the responses and paired synthetic prompts.

In still another example, a system for further development of a first Artificial Intelligence (AI) model while protecting sensitive user information includes: one or more processors providing a confidential computing environment in which original prompts to the first AI model written by users are collected; a second Artificial Intelligence (AI) model providing a synthetic prompt generator that is trained to generate synthetic prompts based on the original prompts, wherein the synthetic prompt generator anonymizes sensitive user information from the original prompts to produce synthetic prompts; and an interface from the confidential computing environment via which the synthetic prompts are submitted to the first AI model under development to provide output that, paired with the synthetic prompts, can be analyzed to determine updates for the first AI model while protecting the sensitive user information of actual users.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

As noted above, designers and developers of LLM-based systems need access to user prompts and the corresponding LLM-generated outputs to review, analyze, and improve the system's performance. Without insight into how the LLM is performing, developers have difficulty finding bugs or effectively implementing improvements. However, providing developers and others with access to the prompts and resulting output compromises the privacy of users, particularly where confidential or personal information was unwittingly or inadvertently included in the prompts.

This issue could potentially be addressed by trying to remove all the sensitive information from both the prompts and resulting outputs. However, such redaction of the prompts and responses inevitably degrades the value of the data in effectively understanding and diagnosing the operation of the LLM. This is a technical problem that limits the ability of developers to improve on existing AI models.

Consequently, the following description provides a technical solution to this technical problem. As described below, a separate pipeline generates synthetic prompts based on the original user prompts, where the synthetic prompts are anonymized. In one example, there is no 1:1 correspondence between the original prompts and synthetic output. In another example, a new version of each user prompt from which any sensitive information is removed is produced. In either case, the synthetic prompts are then used with the main LLM to generate a corresponding set of responses. This new data of synthetic prompts and responses is free from any sensitive user information, but still approximates for a developer the case of the original user prompt and its corresponding LLM response. Thus, the developer can use the synthetic prompts and responses as an accurate sample of the LLM's behavior. This allows the developer to effectively analyze the LLM/s behavior so as to debug or improve the LLM. Significantly, this analysis is based on the LLMs actual behavior with data approximating real user activity.

As used herein and in the appended claims, the term "sensitive information" is used to refer to information that a user typically wants to keep confidential. This can include personally identifiable information (PII) such as a name, identification number or contact information. Sensitive information also includes account numbers, passwords, health information, etc. Sensitive information may include evidence that a particular user prompted the system at all. For example, an AI model may output health advice, and the user generates a prompt describing their health condition. In such as case, the described system should make it difficult to discern that this particular user ever queried the model.

As used herein and in the appended claims, the term "AI model" will be used broadly to refer to an AI system that receives user input and provides a corresponding output. For example, AI models can include LLMs, GPTs and other AI systems.

As used herein and in the appended claims, the term Large Language Model or LLM will be used to refer to AI models that receive a textual prompt, usually in natural language. However, the output may be in text form or may include images or images combined with text. Thus, a text-to-image AI model would be within the meaning of LLM as used herein. For example, a user prompt to an LLM might include "generate a greeting card for my grandmother," and the output of the LLM would be one or a number of alternative designs for such a greeting card.

As noted above, an example of a system for development of an Artificial Intelligence (AI) model while protecting sensitive user information includes: a confidential computing environment in which original prompts to the AI model written by users are collected; a trained synthetic prompt generator to generate synthetic prompts based on the original prompts, wherein the synthetic prompt generator removes sensitive user information from the original prompts to produce corresponding synthetic prompts; and a developer computing environment in which the synthetic prompts are submitted to the AI model under development to generate a dataset that includes the synthetic prompts and corresponding AI model output for analysis to determine updates for the AI model while protecting the sensitive user information of actual users.

Figure 1:
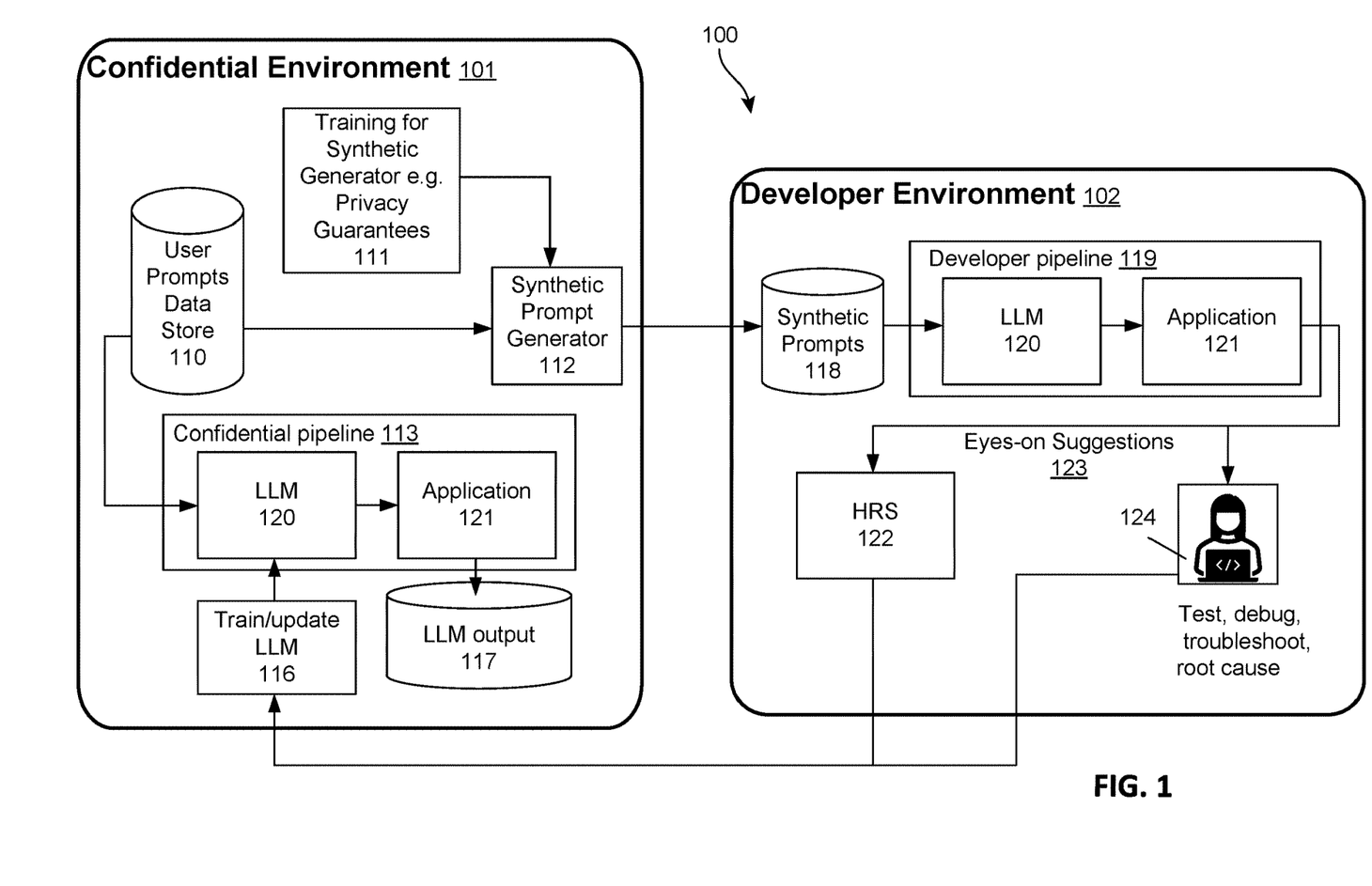
FIG. 1 depicts an example system for protecting sensitive user information when analyzing and improving the operation of an AI model according to aspects of this description.

FIG. 1 depicts such a system for protecting user privacy while providing designers or developers with non-sensitive data for analysis that approximates the behavior of an AI engine as operated by real users. As noted above, user prompts to LLMs like ChatGPT are important datasets that help understand what the user is asking for, similar to a search query. However, because such LLM features within products can be reasoning over a lot of very personal data (e.g., the user's own documents/email/video, the user's company's documents and private data, etc.), these short text snippets can be very sensitive in nature and allowing developers to have eyes-on review of this data could be a significant violation of the privacy of the user who typed them. In turn, these prompts are used to generate real content in documents, such as emails, rich media and content, tabular data, etc. which inherits the same level of sensitivity. Consequently, this output also should not be reviewed eyes-on by human beings and should be securely stored in an eyes-off environment. Users can further make modifications to the suggested content from the LLM, until they adjust it to a final desired state, referred to herein as "kept content."

Eyes-on human review of the prompt as well as the corresponding kept content is invaluable for the feature designers developing these LLM features as such data helps understand natural language variations and user intent, improve the handling of offensive content, determine how to improve the suggestions generation pipeline, and build feature priorities based on what users are actually trying to do. As noted above, to solve these developer issues, this description proposes a new technique to enable eyes-on human review of an approximation of the prompt data, via the following pipeline.

The user prompts are collected from client applications (the User Experience (UX) layer where the user is typing them, or the service backing the app) and stored in a compliant data store as a table of strings. A PII scrubbing job could be run to sanitize the dataset.

A batch fine-tuning job is setup which fine-tunes an LLM (such as GPT-2, GPT-3 etc.) on this set of prompts, using techniques such as differentially private stochastic gradient descent (DP-SGD). This fine-tuned LLM is then in turn prompted to generate synthetic prompts that closely mimic the actual user prompts. The initial PII sanitization and differential privacy applied during fine-tuning significantly reduces the probability of leaking sensitive private user information (such as their name, address, date of birth, specifics about their occupation/health/personal circumstances, etc.). At this stage, the synthetic prompts can be run against quality metrics like cosine distance, etc. to measure how closely they approximate the real user prompts. They can also be run through PII detection and other jobs to ensure that there is no leak of sensitive information.

These synthetic prompts then, in turn, are run through the rest of the LLM pipeline for the specific feature. For instance, for a designer application, which allows users to write prompts to generate high quality visual designs, the prompts are run through the identical pipeline for the designer application and the generated design suggestions are saved along with the prompts as a training dataset.

This training dataset of (prompt, content) is now a completely synthetic, non-personal dataset. It is subject to much less strict data handling obligations (such as GDPR) because we can assert that the data is not personally linkable to any human. This dataset is then run through a Human Review System (HRS) which can then be shown to human labelers at scale, to get human feedback on how well the suggested content (e.g. designs) corresponds to that specific prompt. Human labelers can tag the input prompts as offensive (if they have certain terms or themes that make them so), or non-offensive (if they erroneously get tagged as such) which can also help improve the underblocking or overblocking of offensive content. The labelling of design suggestions would serve as a proxy for 'kept' designs. This aggregated human label data can be used as part of a reinforcement learning policy to further label data at scale similar to Reinforcement Learning from Human Feedback (RLHF) systems.

The final human labelled dataset would then serve as training data to fine-tune the pipeline. It is entirely human reviewable, making the iteration process much more agile while preserving the users' privacy.

Referring specifically to FIG. 1, a system 100 according to the principles described herein includes the following components and functions. First, the actual collected user prompts to an AI engine, e.g., an LLM, are collected in a data store 110 within a confidential environment 101. The confidential environment 101 includes protections to prevent human access and viewing of the data, particularly, the user prompts 110. Within the confidential environment 101, a synthetic prompt generator 112 is trained with privacy guarantees 111. For example, the synthetic prompt generator 112 is a separate LLM, perhaps a GPT, that has been trained to receive as input a user prompt that might contain sensitive information and output a synthetic prompt that approximates the original prompt as much as possible while removing any sensitive information.

In a first example, training the synthetic prompt generator 112 includes using differential privacy with the original user prompts as the training set. In this example, the synthetic data generator may be trained using the original user prompts along with a differentially private training method such as DP-SGD which doesn't learn to specifically identify sensitive information but instead fails to learn relatively rare information that might be associated with only one individual. This makes it much less likely to produce sensitive information when prompted to produce synthetic prompts. Thus, the training method is designed to prevent learning statistically rare occurrences, which will naturally exclude any information that could be uniquely linked to an individual. The resulting model can be generically prompted to produce new synthetic prompts without requiring a specific corresponding original prompt. Thus, there would be no 1:1 mapping between original inputs and synthetic outputs. Rather, there would be a general overall correlation between the two datasets while providing a strong privacy guarantee.

In another example, training the synthetic prompt generator 112 may include fine-tuning a pre-trained LLM specifically to recognize and treat sensitive information, as mentioned above. In such a case, a set of training data is prepared that includes a population of prompts that include sensitive information and a corresponding population of alternative prompts in which the original prompt is rewritten to preserve meaning, intent and context without the sensitive information. The general, pre-trained LLM is then further trained on this set of training data to learn more effectively how to produce the desired synthetic prompts. Thus, the privacy guarantees 111 used to train the synthetic prompt generator 112 include training to recognize sensitive information, perhaps based on typical types or formats of sensitive information, and how to avoid that sensitive information in generating a corresponding synthetic prompt. For example, the synthetic prompt generator 112 can be trained to recognize the format of a social security number, phone number, date of birth, account number, etc. The synthetic prompt generator 112 can also, from the context, identify these types of sensitive information and others such as names, passwords, addresses, etc.

In some cases, the synthetic prompt generator 112 may simply omit the sensitive information. However, simply omitting the sensitive information may render the content or intent of the original prompt meaningless or unintelligible. Consequently, the training of the synthetic prompt generator 112 will include how to rephrase the original user prompt without the sensitive information but while preserving the original context and intent. In some cases, this could include substituting fictitious information into the synthetic prompt in place of the sensitive information. In other cases, this could include substituting a generic placeholder, such as "anonymous" or "unspecified" in place of the sensitive information. Once generated, the synthetic prompts 118 can safely leave the confidential environment 101 for use by human developers in a developer environment 102.

Within the developer environment 102, the synthetic prompts 118 can be used in a developer pipeline 119 that includes an LLM 120 that is the same or very similar to the LLM for which the user prompts 110 were originally intended to which the original user prompts 110 were input. This pipeline 119 can include an application 121 through which users access the LLM 120. This application 121 could be a browser, for example, or a productivity application with LLM call features integrated, such as Designer™ by Microsoft®.

This then allows the developers 124 of the LLM 120 to observe its behavior on input that approximates actual user input only without the risk of divulging sensitive user information. The synthetic prompts, as processed by the LLM 120, can provide a much more accurate picture of the real operation, capabilities and limitations of the LLM 120 in a real user environment than would be the case with partial user prompts from which sensitive information is simply deleted without any other adjustment. Thus, the human developers 124 are much better able to test, debug, trouble shoot and diagnose the operation of the LLM 120 than would otherwise be the case. The result is that, when users are utilizing the LLM 120 (or its counterpart in another pipeline), the LLM can be upgraded and improved based on previous activity as seen through the synthetic prompts 118 and corresponding responses. In FIG. 1, eyes-on suggestions 123 represent the output of the LLM 120 in response to the synthetic prompts 118.

As also shown in the developer environment 102, the output of the developer pipeline 119 may be made available to a Human Review System (HRS) 122. The HRS 122 is a system that allows other human users, apart from the developers 124, to access the output of the LLM 120, i.e., the pairs of a synthetic prompt and its corresponding response form the LLM. These additional users can provide feedback on the quality or accuracy of the LLM in responding to the synthetic prompt. The community with access to the HRS 122 can be defined as desired, for example, employees of a company, specific departments in an organization or interested members of the public generally.

The feedback from both the developers 124 and the HRS 122 can be used as input 116 to further train or update the LLM 120. In this way, the system 100 more effectively and rapidly improves the LLM 120 than could be done without synthetic prompts and without compromising user confidentiality and sensitive information.

As also shown in FIG. 1, the confidential environment 101 may also include a confidential pipeline 113 that includes the LLM 120 and the application 121 used to interface with the LLM. Thus, within the secured confidential environment, the original user prompts 110 can be input to the LLM 120. The LLM output 117 can then be stored in the secure confidential environment 101. This LLM output 117 includes the pairs of an original user prompt and the response generated by the LLM to that prompt.

Figure 2:
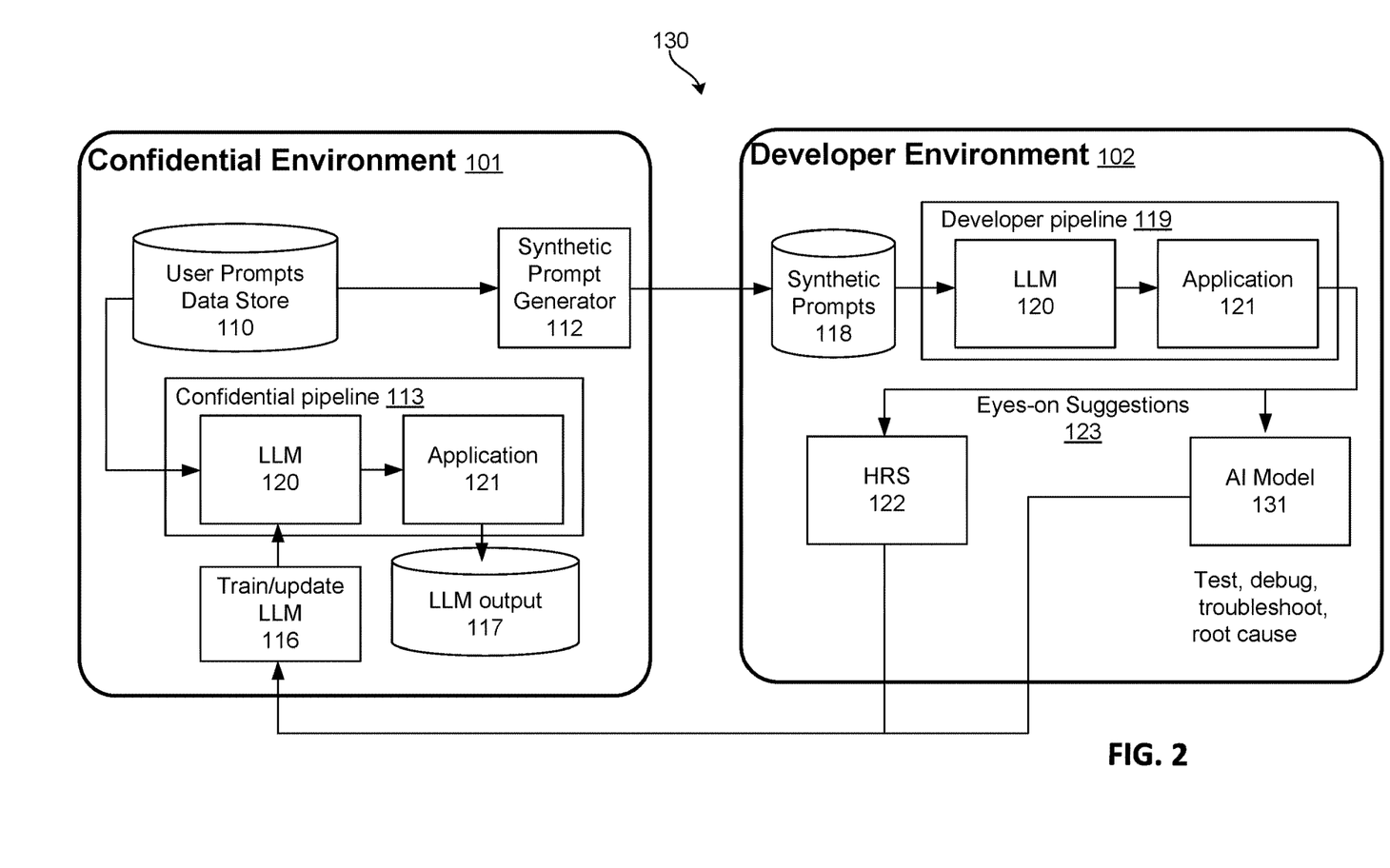
FIG. 2 depicts another example of a system in which aspects of this description may be implemented.

FIG. 2 depicts an alternative system 130 that is similar to the system of FIG. 1. However, as illustrated in FIG. 2, an AI model 131, e.g., an LLM or other AI system, can be trained to perform the role of the human developers 124 in FIG. 1. Thus, the non-confidential response 123 output by the LLM 120, paired with a corresponding synthetic prompt, can be input to an AI model 131 that is trained specifically to evaluate the quality or responsiveness of the output 123 against the prompt 118. The output 116 of this AI model 131 can then be used to train or update the LLM 120. This can be done with or without the concurrent use of an HRS 122 to provide updates 116 to the LLM 120.

Figure 3:
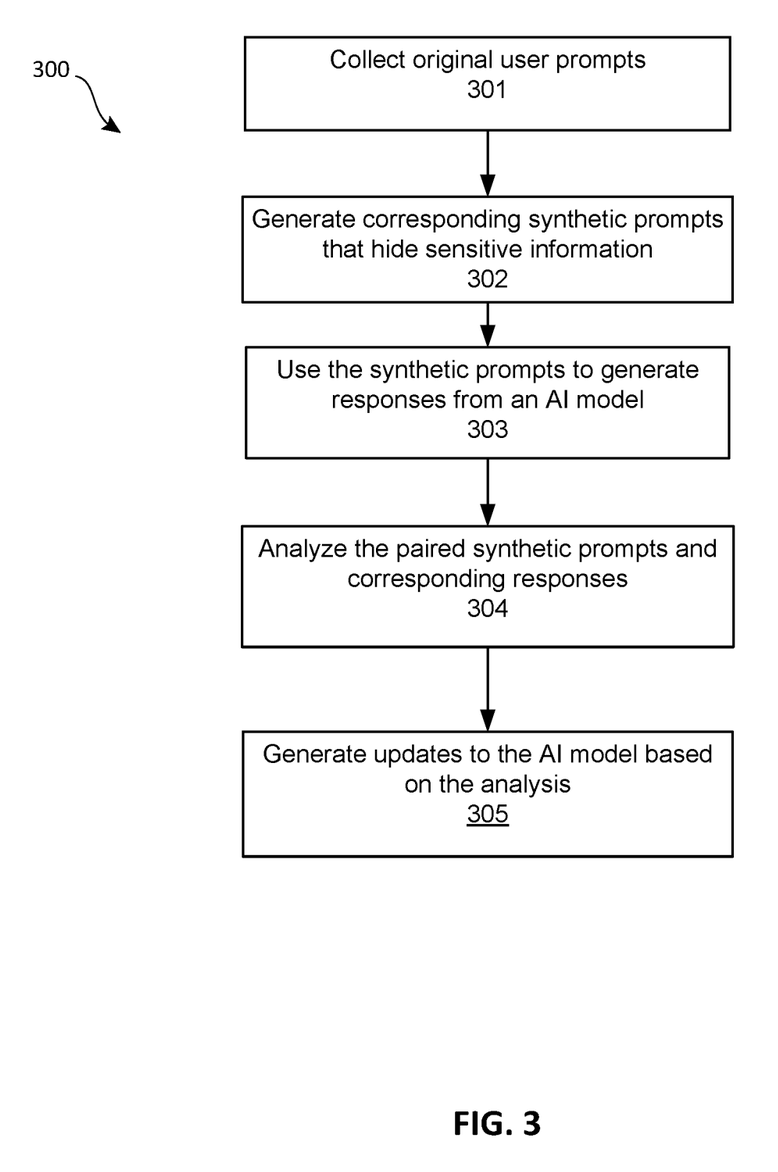
FIG. 3 is a flowchart showing an example method of protecting sensitive user information when analyzing and improving the operation of an AI model according to aspects of this description.

FIG. 3 is a flowchart 300 illustrating a process according to the principles of the present description and consistent with the operation of the systems described in FIGS. 1 and 2. As noted above, a method for development of an Artificial Intelligence (AI) model while protecting sensitive user information includes: collecting original user prompts written for the AI model; generating corresponding synthetic prompts that hide sensitive information from the original user prompts; using the synthetic prompts to generate responses from the AI model; analyzing the responses from the AI model, each paired with a corresponding synthetic prompt from which the response was generated; and generating updates to the AI model based on the analyzing of the responses and paired synthetic prompts.

As shown in FIG. 3, the process begins with collecting 301 original user prompts to an AI model. These original user prompts are used to generate 302 synthetic prompts that hide sensitive information. As described above, a synthetic prompt, as used herein, is a prompt based on an original user prompt but from which any sensitive information has been excised with an effort to remain consistent with the meaning, context and intent of the corresponding original user prompt.

The synthetic prompts are then used to generate 303 responses from an AI model. This AI model is the same or similar to the AI model for which the original user prompts were intended. The method then analyzes 304 the results, i.e., each pair consisting of a synthetic prompt and output resulting from providing that prompt to the AI model. From this analysis, updates to the AI model are generated 305. In this way, the AI model can be most efficiently updated based on its behavior with a close approximation of actual user operation while still protecting the confidentiality and sensitive information of the users.

Figure 4:
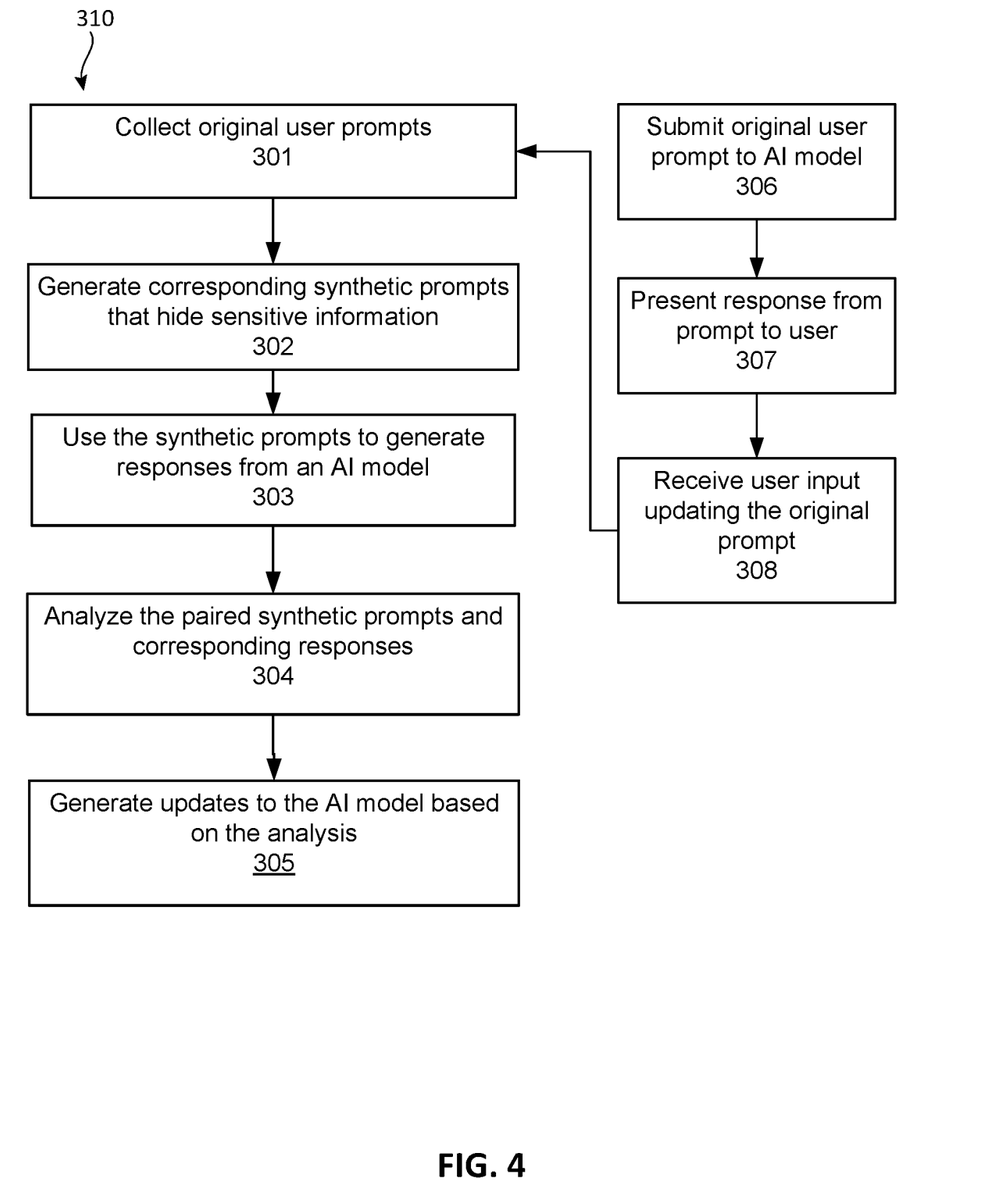
FIG. 4 is another flowchart of an additional example of a method of protecting sensitive user information when analyzing and improving the operation of an AI model according to aspects of this description.

FIG. 4 is another flowchart 310 illustrating additional aspects of a method according to the principles of the present description and consistent with the operation of the systems described in FIGS. 1 and 2. As shown in FIG. 4, concurrently with the operation described in FIG. 3, the original user prompt is submitted 306 to the intended AI model. The AI model then generates a response that is presented 307 to the user.

The user will naturally determine a level of satisfaction with the response. If the user is dissatisfied with the response, the user may make another attempt by updating the prompt that was originally used. For example, the user may see that the prompt needs to be more specific or detailed, or the prompt needs to specify what not to do or include in the response. In other examples, an updated prompt may include specific instructions of what to change or do differently as compared to the original response.

The user thus provides input updating 308 the original response. This updated response constitutes an original user prompt that can also be collected 301 and processed according to the method of FIG. 3, as shown in FIG. 4. By capturing updated user prompts that inherently critique the operation of the AI model, the method provides a richer data set on which to operate. Again, sensitive information is protected as the additional operational data is processed through to an update 305 for the AI model.

In summary, a system for further development of a first Artificial Intelligence (AI) model while protecting sensitive user information includes: one or more processors providing a confidential computing environment in which original prompts to the first AI model written by users are collected; a second Artificial Intelligence (AI) model providing a synthetic prompt generator that is trained to generate synthetic prompts based on the original prompts, wherein the synthetic prompt generator removes sensitive user information from the original prompts to produce corresponding synthetic prompts; and an interface from the confidential computing environment via which the synthetic prompts are submitted to the first AI model under development to provide output that, paired with the synthetic prompts, can be analyzed to determine updates for the first AI model while protecting the sensitive user information of actual users.

In such a system, the generation of synthetic prompts on-the-fly, as well as the use of these synthetic prompts to in turn generate suggested content, results in datasets that mimic real user interactions. Specific advantages of this approach include: 1. Ability to fine-tune content moderation for user prompts based on real-world terms used by users. 2. Granular human review and data explorations are possible by feature owners, such as exploring natural language variations in prompts for the same intent, which can help tune the pipeline. 3. On-demand generation of arbitrarily large datasets is possible, especially with a large enough training dataset and temperature of the fine-tuned LLM that is acting as the synthetic data generator. This can also help build a more homogenous dataset that can better accommodate underrepresented groups or very niche scenarios. 4. Debuggability is significantly improved with these datasets since a developer can view all parts of the functional data eyes-on. 5. Fine-tuning and distillation of the feature's LLM based on this human-labelled training dataset would result in a model that has a negligible probability of attacks like membership inference, or privacy leaks, which simplifies the fine-tuning pipeline. 6. A/B testing of the functional pipeline and prompt engineering can be performed based on the synthetic prompts and A/B generated content, which enables a pipeline to get early results based on real-world use cases of improvements or regressions in the test vs control pipeline.

Figure 5:
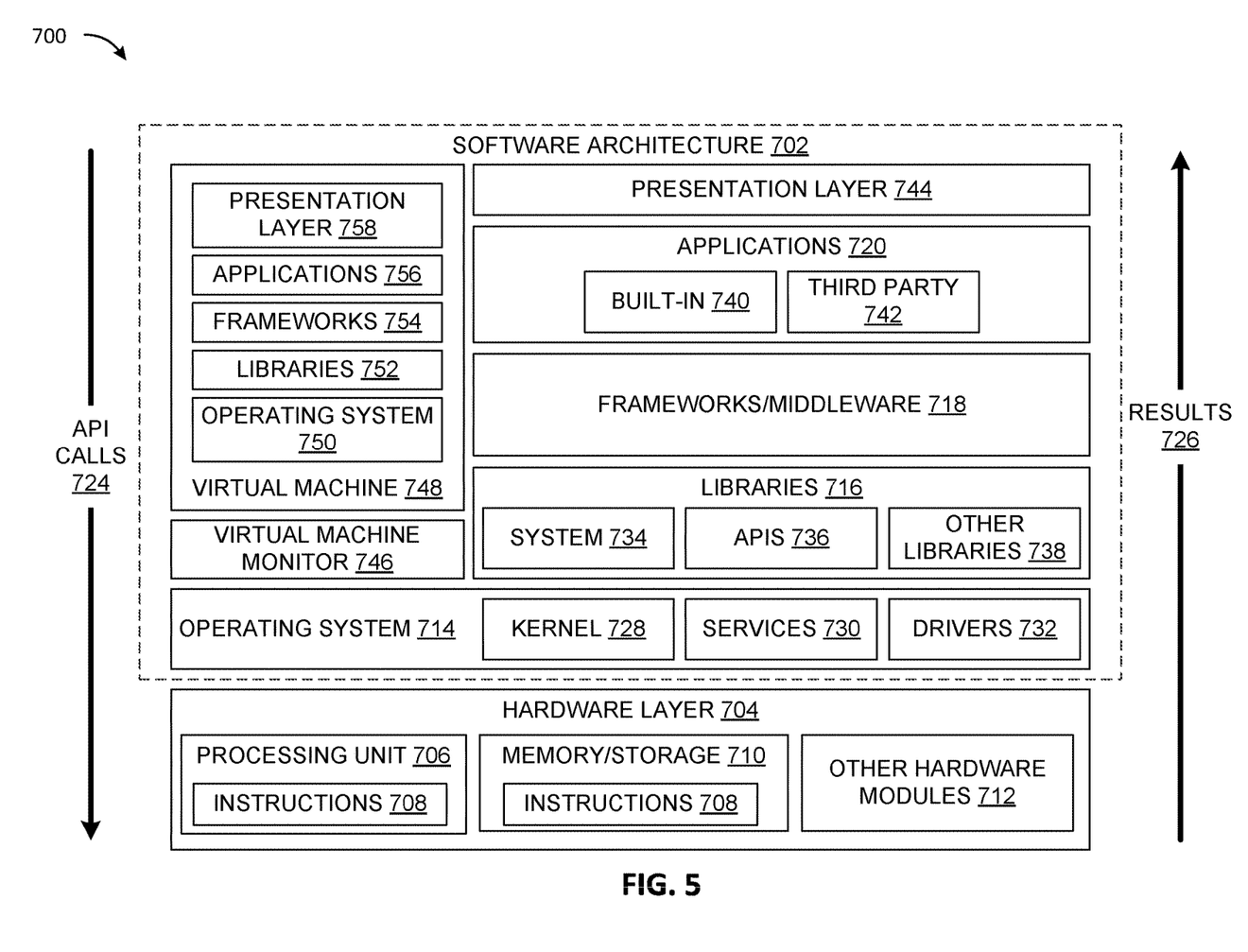
FIG. 5 is a block diagram illustrating an example software architecture, various portions of which may be used in conjunction with various hardware architectures herein described.

FIG. 5 is a block diagram 700 illustrating an example software architecture 702, various portions of which may be used in conjunction with various hardware architectures herein described, which may implement any of the above-described features. This software architecture may underlay any of the AI models or applications described above. FIG. 5 is a non-limiting example of a software architecture, and it will be appreciated that many other architectures may be implemented to facilitate the functionality described herein. The software architecture 702 may execute on hardware such as a machine 800 of FIG. 6 that includes, among other things, processors 810, memory 830, and input/output (I/O)

components 850. A representative hardware layer 704 is illustrated and can represent, for example, the machine 800 of FIG. 6. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 6, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 6:
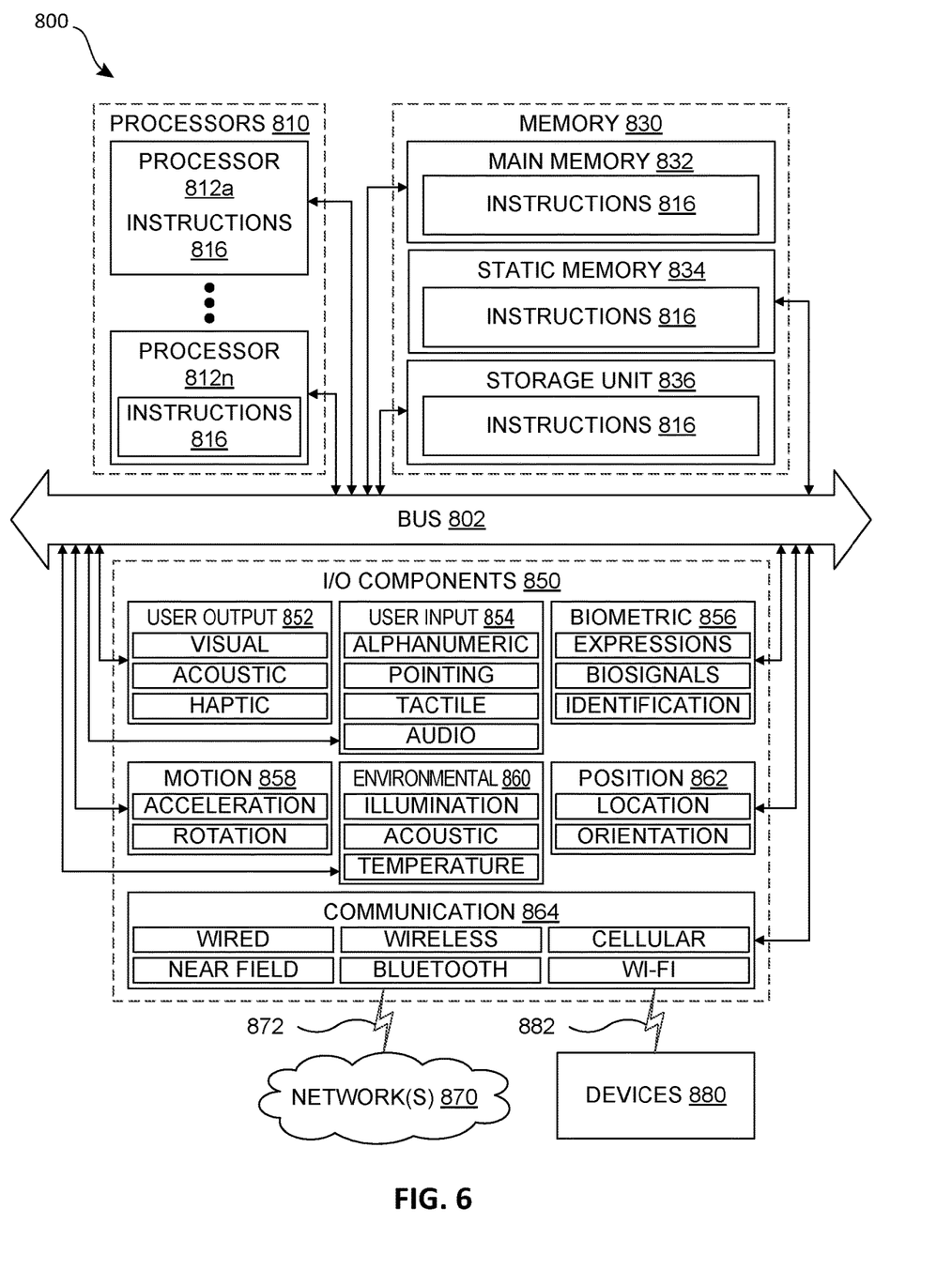
FIG. 6 is a block diagram illustrating components of an example machine configured to read instructions from a machine-readable medium and perform any of the features described herein.

FIG. 6 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. The example machine 800 of FIG. 6 can be used in providing any of the computing environments or pipelines described above.

As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 6 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP)

address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A system for development of an Artificial Intelligence (AI) model while protecting sensitive user information, the system comprising:
  a confidential computing environment in which original prompts to the AI model written by users are collected;
  a trained synthetic prompt generator to generate synthetic prompts based on the original prompts, wherein the synthetic prompt generator generates anonymized synthetic prompts without sensitive user information identifiable from the original prompts; and
  a developer computing environment in which the synthetic prompts are submitted to the AI model under development to generate a dataset that includes the synthetic prompts and corresponding AI model output for analysis to determine updates for the AI model while protecting the sensitive user information of actual users.

Item 2. The system of Item 1, wherein the synthetic prompt generator is trained using the original prompts along with a differentially private training method.

Item 3. The system of Item 1, further comprising a training set having:
  a first set of prompts that contain information that identifies as sensitive information; and
  a second set of corresponding prompts from which the information that identifies as sensitive information has been removed while preserving an intent of a matching prompt from the first set of prompts;
  wherein the trained synthetic prompt generator is fine-tuned using the training set.

Item 4. The system of Item 1, wherein the developer environment further comprising a developer pipeline in which the synthetic prompts are input to the AI model through an application that calls the AI model, the output of the AI model being provided through the application for analysis.

Item 5. The system of Item 1, wherein the developer environment further comprises a human review system with which authorized users can provide feedback on the output of the AI model and paired synthetic prompts.

Item 6. The system of Item 1, wherein the AI model is a Large Language Model (LLM).

Item 7. The system of Item 1, wherein the confidential environment further comprises:
  a confidential pipeline comprising a version of the AI model to receive the original user prompts; and
  a secured database to store the original user prompts and corresponding AI model output.

Item 8. The system of Item 7, wherein updates to the AI model determined in the developer environment are applied to the version of the AI model in the confidential pipeline.

Item 9. The system of Item 1, wherein the developer environment further comprises a second AI model trained to receive the output from the AI model under development and synthetic prompts and to generate updates to the AI model under development.

Item 10. A method for development of an Artificial Intelligence (AI) model while protecting sensitive user information, the method comprising:
  collecting original user prompts written for the AI model;
  generating synthetic prompts based on the original user prompts that hide sensitive information from the original user prompts;
  using the synthetic prompts to generate responses from the AI model;
  analyzing the responses from the AI model, each paired with a corresponding synthetic prompt from which the response was generated; and
  generating updates to the AI model based on the analyzing of the responses and paired synthetic prompts.

Item 11. The method of Item 10, further comprising fine-tuning a synthetic prompt generator for producing the synthetic prompts using a training set having:
  a first set of prompts that contain information that identifies as sensitive information; and
  a second set of corresponding prompts from which the information that identifies as sensitive information has been removed while preserving an intent of a matching prompt from the first set of prompt.

Item 12. The method of Item 10, further comprising collecting the user prompts within a confidential computing environment protected from human eyes-on access.

Item 13. The method of Item 10, further comprising inputting the synthetic prompts to the AI model in a developer pipeline comprising an application that calls the AI model, output of the AI model being provided through the application for analysis.

Item 14. The method of Item 10, further comprising conducting the analyzing in a developer computing environment that provides access by human developers to the responses and paired synthetic prompts for eyes-on analysis.

Item 15. The method of Item 14, wherein the developer environment further comprises a human review system with which authorized users can provide feedback on the response of the AI model and paired synthetic prompts.

Item 16. The method of Item 10, wherein the AI model is a Large Language Model (LLM) and the original user prompts are in natural language.

Item 17. The method of Item 12, wherein the confidential environment further comprises:
  a confidential pipeline comprising a version of the AI model to receive the original user prompts; and
  a secured database to store the original user prompts and corresponding AI model output.

Item 18. The method of Item 17, further comprising applying the updates to the version of the AI model in the confidential pipeline.

Item 19. The method of Item 10, further comprising, with a second AI model trained to receive the response and paired synthetic prompts, generating updates to the AI model under development.

Item 20. A system for further development of a first Artificial Intelligence (AI) model while protecting sensitive user information, the system comprising:
  one or more processors providing a confidential computing environment in which original prompts to the first AI model written by users are collected;
  a second Artificial Intelligence (AI) model providing a synthetic prompt generator that is trained to generate synthetic prompts based on the original prompts, wherein the synthetic prompt generator anonymizes sensitive user information from the original prompts to produce synthetic prompts; and
  an interface from the confidential computing environment via which the synthetic prompts are submitted to the first AI model under development to provide output that, paired with the synthetic prompts, can be analyzed to determine updates for the first AI model while protecting the sensitive user information of actual users.

In the foregoing detailed description, numerous specific details were set forth by way of examples in order to provide a thorough understanding of the relevant teachings. It will be apparent to persons of ordinary skill, upon reading the description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for development of a first large language model (LLM) while protecting sensitive user information, the system comprising:
    a confidential computing environment in which original prompts to the first LLM written by users are collected;
    a synthetic prompt generator to generate synthetic prompts based on the original prompts, wherein the synthetic prompt generator further includes a second LLM that generates anonymized synthetic prompts without the sensitive user information identifiable from the original prompts; and
    a developer computing environment in which the synthetic prompts are submitted to the first LLM to generate a dataset that includes the synthetic prompts and corresponding responses from the first LLM for analysis to determine updates for the first LLM while protecting the sensitive user information.

2. The system of claim 1, wherein the synthetic prompt generator is trained using the original prompts along with a differentially private training method.

3. The system of claim 1, further comprising a training set having:
    a first set of prompts that contain information that identifies as the sensitive user information; and
    a second set of corresponding prompts from which the information that identifies as the sensitive user information has been removed while preserving an intent of a matching prompt from the first set of prompts;
    wherein the synthetic prompt generator is fine-tuned using the training set.

4. The system of claim 1, wherein the developer environment further comprising a developer pipeline in which the synthetic prompts are input to the first LLM through an application that calls the first LLM, an output of the first LLM being provided through the application for analysis.

5. The system of claim 1, wherein the developer environment further comprises a human review system with which authorized users can provide feedback on an output of the first LLM and paired synthetic prompts.

6. The system of claim 1, wherein the confidential environment further comprises:
    a confidential pipeline comprising the second LLM to receive the original user prompts; and
    a secured database to store the original user prompts and corresponding output from the second LLM.

7. The system of claim 6, wherein updates to the first LLM determined in the developer environment are applied to the second LLM in the confidential pipeline.

8. A method for development of a first large language model (LLM) while protecting sensitive user information, the method comprising:
    collecting original user prompts written for the first LLM;
    generating synthetic prompts using a second LLM based on the original user prompts that hide sensitive information from the original user prompts;
    using the synthetic prompts to generate responses from the first LLM;
    analyzing the responses from the first LLM, each paired with a corresponding synthetic prompt from which the response was generated; and
    generating updates to the first LLM based on the analyzing of the responses and paired synthetic prompts.

9. The method of claim 8, further comprising fine-tuning a synthetic prompt generator that includes the second LLM for producing the synthetic prompts using a training set having:
    a first set of prompts that contain information that identifies as the sensitive user information; and
    a second set of corresponding prompts from which the information that identifies as the sensitive user information has been removed while preserving an intent of a matching prompt from the first set of prompt.

10. The method of claim 8, further comprising collecting the user prompts withing a confidential computing environment protected from human eyes-on access.

11. The method of claim 8, further comprising inputting the synthetic prompts to the first LLM in a developer pipeline comprising an application that calls the first LLM, an output of the first LLM being provided through the application for analysis.

12. The method of claim 8, further comprising conducting the analyzing in a developer computing environment that provides access by human developers to the responses and the synthetic prompts for eyes-on analysis.

13. The method of claim 12, wherein the developer computing environment further comprises a human review system with which authorized users can provide feedback on the responses of the first LLM and the synthetic prompts.

14. The method of claim 8, wherein the original user prompts are in natural language.

15. The method of claim 10, wherein the confidential computing environment further comprises:
    a confidential pipeline including the second LLM to receive the original user prompts; and
    a secured database to store the original user prompts and a corresponding second LLM output.

16. The method of claim 15, further comprising applying the updates to the second LLM in the confidential pipeline.

17. A system for further development of a first large language model (LLM) while protecting sensitive user information, the system comprising:
    one or more processors providing a confidential computing environment in which original prompts to a second LLM written by users are collected;
    a synthetic prompt generator including the second LLM that is trained to generate synthetic prompts based on the original prompts, wherein the synthetic prompt generator anonymizes the sensitive user information from the original prompts to produce synthetic prompts; and
    an interface from the confidential computing environment via which the synthetic prompts are submitted to the first LLM under development to provide an output that, paired with the synthetic prompts, can be analyzed to determine updates for the first LLM while protecting the sensitive user information.

* * * * *